(12) United States Patent
Cao et al.

(10) Patent No.: US 12,694,564 B2
(45) Date of Patent: Jul. 28, 2026

(54) DEPTH ESTIMATION METHOD AND APPARATUS, METHOD AND APPARATUS FOR TRAINING DEPTH ESTIMATION MODEL, AND SYSTEM

(71) Applicant: Yinwang Intelligent Technologies Co., Ltd., Shenzhen (CN)

(72) Inventors: Qi Cao, Shenzhen (CN); Di Zhang, Shenzhen (CN); Shuzhan Bi, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 219 days.

(21) Appl. No.: 18/614,676

(22) Filed: Mar. 24, 2024

(65) Prior Publication Data

US 2024/0265572 A1    Aug. 8, 2024

Related U.S. Application Data

(63) Continuation of application No. PCT/CN2022/118614, filed on Sep. 14, 2022.

(30) Foreign Application Priority Data

Sep. 29, 2021    (CN) .......................... 202111154326.6

(51) Int. Cl.
| | |
|---|---|
| *G06T 7/73* | (2017.01) |
| *G06T 7/564* | (2017.01) |
| *G06T 7/593* | (2017.01) |

(52) U.S. Cl.
CPC .............. *G06T 7/74* (2017.01); *G06T 7/564* (2017.01); *G06T 7/593* (2017.01);
(Continued)

(58) Field of Classification Search
None
See application file for complete search history.

(56) References Cited

U.S. PATENT DOCUMENTS

| | | | |
|---|---|---|---|
| 2020/0265597 A1* | 8/2020 | Ye ......................... | G06N 3/0464 |
| 2020/0410259 A1* | 12/2020 | Srinivasan ........... | G01S 7/4808 |
| 2022/0335638 A1* | 10/2022 | Kar ......................... | G06T 7/593 |

FOREIGN PATENT DOCUMENTS

WO          2020185973  A1      9/2020

OTHER PUBLICATIONS

Eigen et al., "Depth Map Prediction from a Single Image using a Multi-Scale Deep Network," XP055566498, total 9 pages (Jun. 9, 2014).

(Continued)

*Primary Examiner* — Leon Flores

(74) *Attorney, Agent, or Firm* — Leydig, Voit & Mayer, Ltd.

(57) ABSTRACT

In a depth estimation method, a depth estimation apparatus obtains a first color image, and inputs the first color image into a first depth estimation model to obtain a first intermediate depth image. The depth estimation apparatus then inputs the first color image and the first intermediate depth image into a second depth estimation model to obtain a first target depth image. The second depth estimation model is obtained through training based on a color image and a target depth image corresponding to the color image, and the first depth estimation model is obtained through training based on the color image and an intermediate depth image corresponding to the color image.

17 Claims, 9 Drawing Sheets

600

(52) U.S. Cl.
CPC ............... *G06T 2207/10012* (2013.01); *G06T 2207/10024* (2013.01); *G06T 2207/10028* (2013.01); *G06T 2207/20081* (2013.01); *G06T 2207/30252* (2013.01)

(56) References Cited

OTHER PUBLICATIONS

Duan et al., "High Quality Depth Estimation from Monocular Images Based on Depth Prediction and Enhancement Sub-Networks," 2018 IEEE International Conference on Multimedia and Expo (ICME), XP033417615, total 6 pages, Institute of Electrical and Electronics Engineers, New York, New York (Jul. 23, 2018).
Elbir et al., "Federated Learning in Vehicular Networks," arXiv:2006.01412, total 6 pages (Sep. 2020).
"Federal Learning White Paper v2.0," WeBank FedAI, Total 96 pages (Apr. 2020). With an English Translation.

* cited by examiner

200

Cloud server
210

Network

Vehicle 220

Computing platform 221

Processor 222

Memory 223

Instruction 224

300

Color image

Depth estimation model

Detection result

Driving decision-making module

Driving operation

500

Obtain a first color image ⟞ S510

Input the first color image into a first depth model, to obtain a first intermediate depth image ⟞ S520

Input the first color image and the first intermediate depth image into a second depth estimation model, to obtain a first target depth image ⟞ S530

600

700

800

900

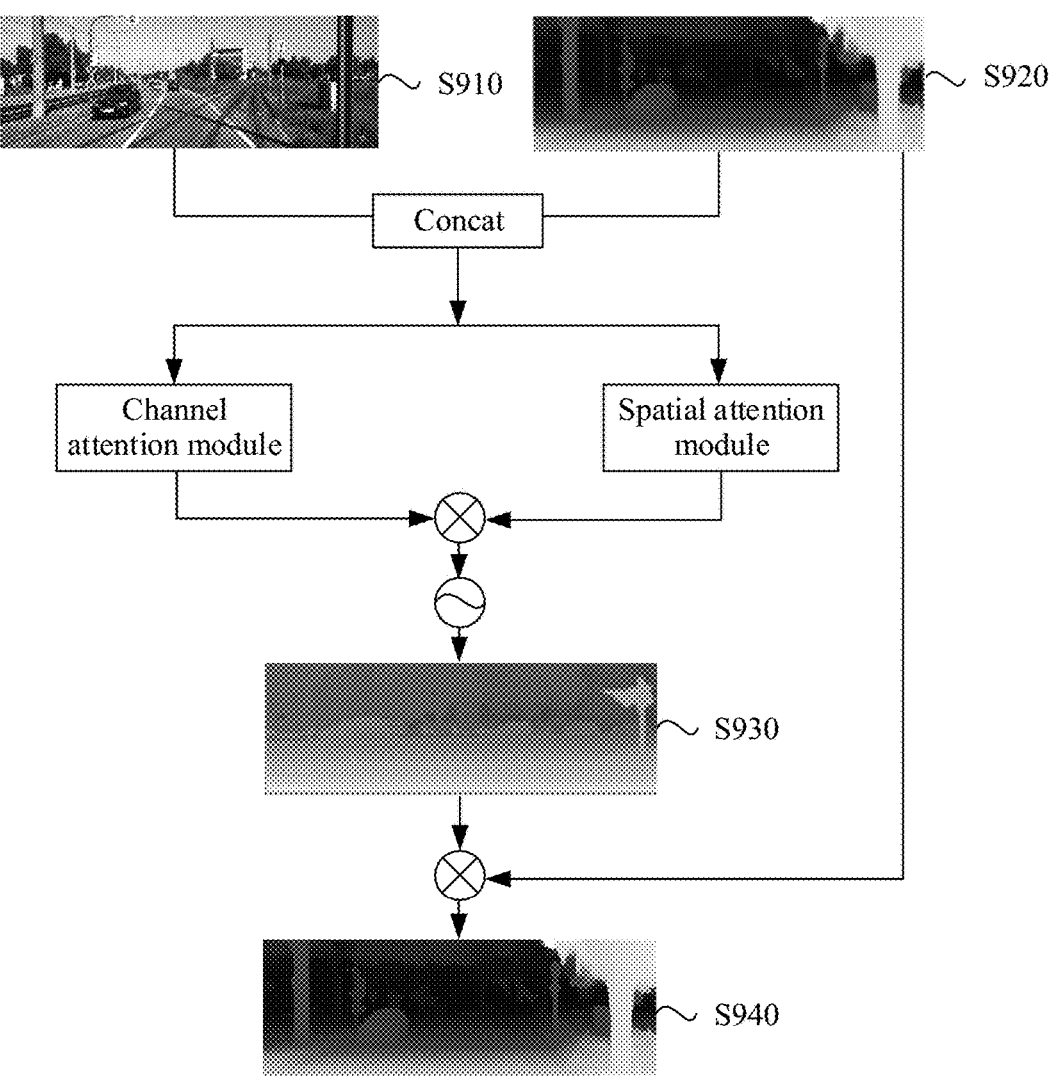

Process a color image by using a first depth estimation model, to obtain an intermediate depth image of the color image, and process the color image and the intermediate depth image of the color image by using a second depth estimation model, to obtain a target depth image of the color image — S1010

Train the first depth estimation model based on the color image and the intermediate depth image of the color image, to obtain an updated first depth estimation model, and train the second depth estimation model based on the color image and the target depth image of the color image, to obtain an updated second depth estimation model — S1020

FIG. 10

DEPTH ESTIMATION METHOD AND APPARATUS, METHOD AND APPARATUS FOR TRAINING DEPTH ESTIMATION MODEL, AND SYSTEM

CROSS-REFERENCE TO RELATED APPLICATIONS

This application is a continuation of International Patent Application No. PCT/CN2022/118614, filed on Sep. 14, 2022, which claims priority to Chinese Patent Application No. 202111154326.6, filed on Sep. 29, 2021. The disclosures of the aforementioned applications are hereby incorporated by reference in their entirety.

TECHNICAL FIELD

This application relates to the field of artificial intelligence, and more specifically, to a depth estimation method and apparatus, a method and an apparatus for training a depth estimation model, and a system.

BACKGROUND

Currently, an unsupervised depth estimation algorithm is one of main algorithms of intelligent driving (ID) and artificial intelligence (AI). The algorithm can estimate, by using a neural network model, depth information of an image shot by a color camera, and is widely used because the algorithm does not need to label a training set.

However, the current unsupervised depth estimation algorithm does not make full use of prior information of color images, resulting in poor quality of a depth estimation image. In addition, although the current unsupervised depth estimation algorithm eliminates a limitation on a training label to some extent, and limits training costs, once an algorithm model is deployed, the quality of the depth estimation image is also poor when a scenario that is not encountered in a training phase is encountered.

Therefore, how to improve the quality of the depth estimation image is a technical problem to be urgently resolved.

SUMMARY

This application provides a depth estimation method and apparatus, a method and an apparatus for training a depth estimation model, and a system, to help improve quality of a depth estimation image.

According to a first aspect, a depth estimation method is provided, including: obtaining a first color image; inputting the first color image into a first depth estimation model, to obtain a first intermediate depth image; and inputting the first color image and the first intermediate depth image into a second depth estimation model, to obtain a first target depth image, where the second depth estimation model is obtained through training based on a color image and a target depth image corresponding to the color image, and the first depth estimation model is obtained through training based on the color image and an intermediate depth image corresponding to the color image.

According to the technical solution of this application, the intermediate depth image corresponding to the color image is obtained based on the color image, and the target depth image corresponding to the color image is obtained based on the color image and the intermediate depth image corresponding to the color image. This can fully use prior information, namely, the color image, and help improve precision of a target depth estimation image.

With reference to the first aspect, in some implementations of the first aspect, the inputting the first color image and the first intermediate depth image into a second depth estimation model, to obtain a first target depth image includes: obtaining a common edge image based on the first color image and the first intermediate depth image, where the common edge image represents a common edge part of the first color image and the first intermediate depth image; and obtaining the first target depth image based on the common edge image and the first intermediate depth image.

According to the technical solution of this application, the common edge image is obtained based on the color image and the intermediate depth image corresponding to the color image, and the target depth image is obtained based on the common edge image and the intermediate depth image corresponding to the color image. This can fully use prior information, namely, the color image, to obtain the common edge image, and effectively use a favorable common edge part in the color image and the intermediate depth image corresponding to the color image, to help improve precision of the target depth estimation image.

With reference to the first aspect, in some implementations of the first aspect, the obtaining a common edge image based on the first color image and the first intermediate depth image includes: splicing the first color image and the first intermediate depth image, to obtain an input matrix; performing dimension reduction on the input matrix, to obtain a first matrix and a second matrix; and obtaining the common edge image based on the first matrix and the second matrix.

With reference to the first aspect, in some implementations of the first aspect, the inputting the first color image into a first depth estimation model, to obtain a first intermediate depth image includes: obtaining a depth feature vector of the first color image based on the first color image, where the depth feature vector includes a first depth feature vector and a second depth feature vector; obtaining a first target feature vector based on the first depth feature vector and a first weight value, and obtaining a second target feature vector based on the second depth feature vector and a second weight value; and obtaining the first intermediate depth image based on the first target feature vector and the second target feature vector.

According to the technical solution of this application, a target vector is obtained based on the depth feature vector and a weight value corresponding to the depth feature vector, so as to obtain the intermediate depth image. This helps improve precision of the depth image.

Optionally, the color image includes a left view or a right view.

Optionally, the color image is shot by one or more cameras disposed on a terminal device.

Optionally, the camera is a binocular camera.

With reference to the first aspect, in some implementations of the first aspect, the method further includes: calculating gradient information of the first depth estimation model and the second depth estimation model based on the first color image and the first target depth image; and sending the gradient information to a first device, where the gradient information is used by the first device to obtain an updated first depth estimation model and an updated second depth estimation model through training.

According to the technical solution of this application, gradient information is calculated based on the color image and the target depth image corresponding to the color image, and the gradient information is sent to the first device, and used by the first device to train and update a depth estimation model. This can resolve a problem of difficult upgrade after model deployment, and help improve model precision.

With reference to the first aspect, in some implementations of the first aspect, the method further includes:

receiving the updated first depth estimation model and the updated second depth estimation model from the first device.

With reference to the first aspect, in some implementations of the first aspect, the method further includes:

obtaining the updated first depth estimation model and the updated second depth estimation model through training based on the gradient information.

According to the technical solution of this application, the gradient information is calculated based on the color image and the target depth image corresponding to the color image, and the depth estimation model is trained and updated based on the gradient information. This can resolve a problem of difficult upgrade after model deployment, and help improve model precision.

According to a second aspect, a training method for a depth estimation model is provided, including: processing a color image by using a first depth estimation model, to obtain an intermediate depth image of the color image; processing the color image and the intermediate depth image of the color image by using a second depth estimation model, to obtain a target depth image of the color image; training the first depth estimation model based on the color image and the intermediate depth image of the color image, to obtain an updated first depth estimation model; and training the second depth estimation model based on the color image and the target depth image of the color image, to obtain an updated second depth estimation model.

According to the technical solution of this application, the first depth estimation model is obtained through training by using a color image, and the second depth estimation model is obtained through training by using the color image and an intermediate depth image corresponding to the color image. The depth estimation model obtained through training can fully use prior information, namely, the color image, to help improve precision of a target depth estimation image.

With reference to the second aspect, in some implementations of the second aspect, the updated second depth estimation model is specifically configured to: obtain a common edge image based on the first color image and the first intermediate depth image, where the common edge image represents a common edge part of the first color image and the first intermediate depth image; and obtain the first target depth image based on the common edge image and the first intermediate depth image.

With reference to the second aspect, in some implementations of the second aspect, the obtaining a common edge image based on the first color image and the first intermediate depth image includes: splicing the first color image and the first intermediate depth image, to obtain an input matrix; performing dimension reduction on the input matrix, to obtain a first matrix and a second matrix; and obtaining the common edge image based on the first matrix and the second matrix.

With reference to the second aspect, in some implementations of the second aspect, the updated first depth estimation model is specifically configured to: obtain a depth feature vector of the first color image based on the first color image, where the depth feature vector includes a first depth feature vector and a second depth feature vector; obtain a first target feature vector based on the first depth feature vector and a first weight value, and obtain a second target feature vector based on the second depth feature vector and a second weight value; and obtain the first intermediate depth image based on the first target feature vector and the second target feature vector.

Optionally, the color image includes a left view or a right view.

Optionally, the color image is shot by one or more cameras disposed on a terminal device.

Optionally, the camera is a binocular camera.

With reference to the second aspect, in some implementations of the second aspect, the training method further includes: receiving gradient information of the first depth estimation model and the second depth estimation model, where the gradient information is obtained by a second device through calculation based on the first color image and the first target depth image; and obtaining the updated first depth estimation model and the updated second depth estimation model through training based on the gradient information.

According to the technical solution of this application, the first device may train and update the depth estimation model based on the gradient information calculated by the terminal device based on the color image and the target depth image corresponding to the color image. This can resolve a problem of difficult upgrade after model deployment, and help improve model precision.

With reference to the second aspect, in some implementations of the second aspect, the training method further includes: sending the updated first depth estimation model and the updated second depth estimation model.

According to a third aspect, a depth estimation apparatus is provided, including: an obtaining unit, configured to obtain a first color image; and a processing unit, configured to: input the first color image into a first depth estimation model, to obtain a first intermediate depth image; and input the first color image and the first intermediate depth image into a second depth estimation model, to obtain a first target depth image, where the second depth estimation model is obtained through training based on a color image and a target depth image corresponding to the color image, and the first depth estimation model is obtained through training based on the color image and an intermediate depth image corresponding to the color image.

With reference to the third aspect, in some implementations of the third aspect, the processing unit is specifically configured to: obtain a common edge image based on the first color image and the first intermediate depth image, where the common edge image represents a common edge part of the first color image and the first intermediate depth image; and obtain the first target depth image based on the common edge image and the first intermediate depth image.

With reference to the third aspect, in some implementations of the third aspect, the processing unit is specifically configured to: splice the first color image and the first intermediate depth image, to obtain an input matrix; perform dimension reduction on the input matrix, to obtain a first matrix and a second matrix; and obtain the common edge image based on the first matrix and the second matrix.

With reference to the third aspect, in some implementations of the third aspect, the processing unit is specifically configured to: obtain a depth feature vector of the first color image based on the first color image, where the depth feature vector includes a first depth feature vector and a second depth feature vector; obtain a first target feature vector based on the first depth feature vector and a first weight value, and obtain a second target feature vector based on the second depth feature vector and a second weight value; and obtain the first intermediate depth image based on the first target feature vector and the second target feature vector.

Optionally, the color image includes a left view or a right view.

Optionally, the color image is shot by one or more cameras disposed on a terminal device.

Optionally, the camera is a binocular camera.

With reference to the third aspect, in some implementations of the third aspect, the processing unit is further configured to calculate gradient information of the first depth estimation model and the second depth estimation model based on the first color image and the first target depth image. The apparatus further includes a sending unit. The sending unit is configured to send the gradient information to a first device, where the gradient information is used by the first device to obtain an updated first depth estimation model and an updated second depth estimation model through training.

With reference to the third aspect, in some implementations of the third aspect, the obtaining unit is further configured to receive the updated first depth estimation model and the updated second depth estimation model from the first device.

According to a fourth aspect, an apparatus for training a depth estimation model is provided, including: an obtaining unit, configured to: process a color image by using a first depth estimation model, to obtain an intermediate depth image of the color image, and process the color image and the intermediate depth image of the color image by using a second depth estimation model, to obtain a target depth image of the color image; and a training unit, configured to: train the first depth estimation model based on the color image and the intermediate depth image of the color image, to obtain an updated first depth estimation model, and train the second depth estimation model based on the color image and the target depth image of the color image, to obtain an updated second depth estimation model.

With reference to the fourth aspect, in some implementations of the fourth aspect, the updated second depth estimation model is specifically configured to: obtain a common edge image based on the first color image and the first intermediate depth image, where the common edge image represents a common edge part of the first color image and the first intermediate depth image; and obtain the first target depth image based on the common edge image and the first intermediate depth image.

With reference to the fourth aspect, in some implementations of the fourth aspect, the training unit is specifically configured to: splice the first color image and the first intermediate depth image, to obtain an input matrix; perform dimension reduction on the input matrix, to obtain a first matrix and a second matrix; and obtain the common edge image based on the first matrix and the second matrix.

With reference to the fourth aspect, in some implementations of the fourth aspect, the updated first depth estimation model is specifically configured to: obtain a depth feature vector of the first color image based on the first color image, where the depth feature vector includes a first depth feature vector and a second depth feature vector; obtain a first target feature vector based on the first depth feature vector and a first weight value, and obtain a second target feature vector based on the second depth feature vector and a second weight value; and obtain the first intermediate depth image based on the first target feature vector and the second target feature vector.

Optionally, a color image includes a left view or a right view.

Optionally, the color image is shot by one or more cameras disposed on a terminal device.

Optionally, the camera is a binocular camera.

With reference to the fourth aspect, in some implementations of the fourth aspect, the obtaining unit is further configured to receive gradient information of the first depth estimation model and the second depth estimation model, where the gradient information is obtained by a second device through calculation based on the first color image and the first target depth image. The training unit is further configured to obtain the updated first depth estimation model and the updated second depth estimation model through training based on the gradient information.

With reference to the fourth aspect, in some implementations of the fourth aspect, the training apparatus further includes a sending unit, where the sending unit is configured to send the updated first depth estimation model and the updated second depth estimation model.

According to a fifth aspect, a depth estimation apparatus is provided, where the apparatus includes a processor and a data interface, and the processor reads, through the data interface, instructions stored in a memory, to perform the method in any implementation of the first aspect.

Optionally, the apparatus may be disposed in various devices or systems that require depth estimation, such as a vehicle-mounted terminal, a mobile terminal, a high definition map system, and an intelligent transportation system.

Optionally, the apparatus may alternatively be a chip.

According to a sixth aspect, an apparatus for training a depth estimation model is provided, where the apparatus includes a processor and a data interface, and the processor reads, through the data interface, instructions stored in a memory, to perform the training method in any implementation of the second aspect.

Optionally, the training apparatus may be a device that can perform model training, for example, a host, a computer, a server, or a cloud device.

Optionally, the training apparatus may alternatively be a chip.

According to a seventh aspect, a computer-readable medium is provided. The computer-readable medium stores program code to be executed by a device, and the program code is used for performing the method in any one of the implementations of the first aspect or the second aspect.

According to an eighth aspect, a computer program product including instructions is provided. When the computer program product runs on a computer, the computer is enabled to perform the method in any one of the implementations of the first aspect or the second aspect.

It should be noted that all or some of computer program code may be stored in a first storage medium. The first storage medium may be encapsulated together with a processor, or may be encapsulated separately from a processor. This is not specifically limited in this embodiment of this application.

According to a ninth aspect, a chip is provided. The chip includes a processor and a data interface. The processor performs the method in any one of the implementations of the first aspect or the second aspect by reading, through the data interface, instructions stored in a memory.

Optionally, in an implementation, the chip may further include the memory. The memory stores the instructions, the processor is configured to execute the instructions stored in the memory, and when the instructions are executed, the processor is configured to perform the method according to any one of the implementations of the first aspect.

BRIEF DESCRIPTION OF DRAWINGS

FIG. 9 is a schematic flowchart of an example of a second depth estimation model according to this application;

FIG. 10 is a schematic flowchart of an example of a method for training a depth estimation model according to this application;

DESCRIPTION OF EMBODIMENTS

Figure 1:
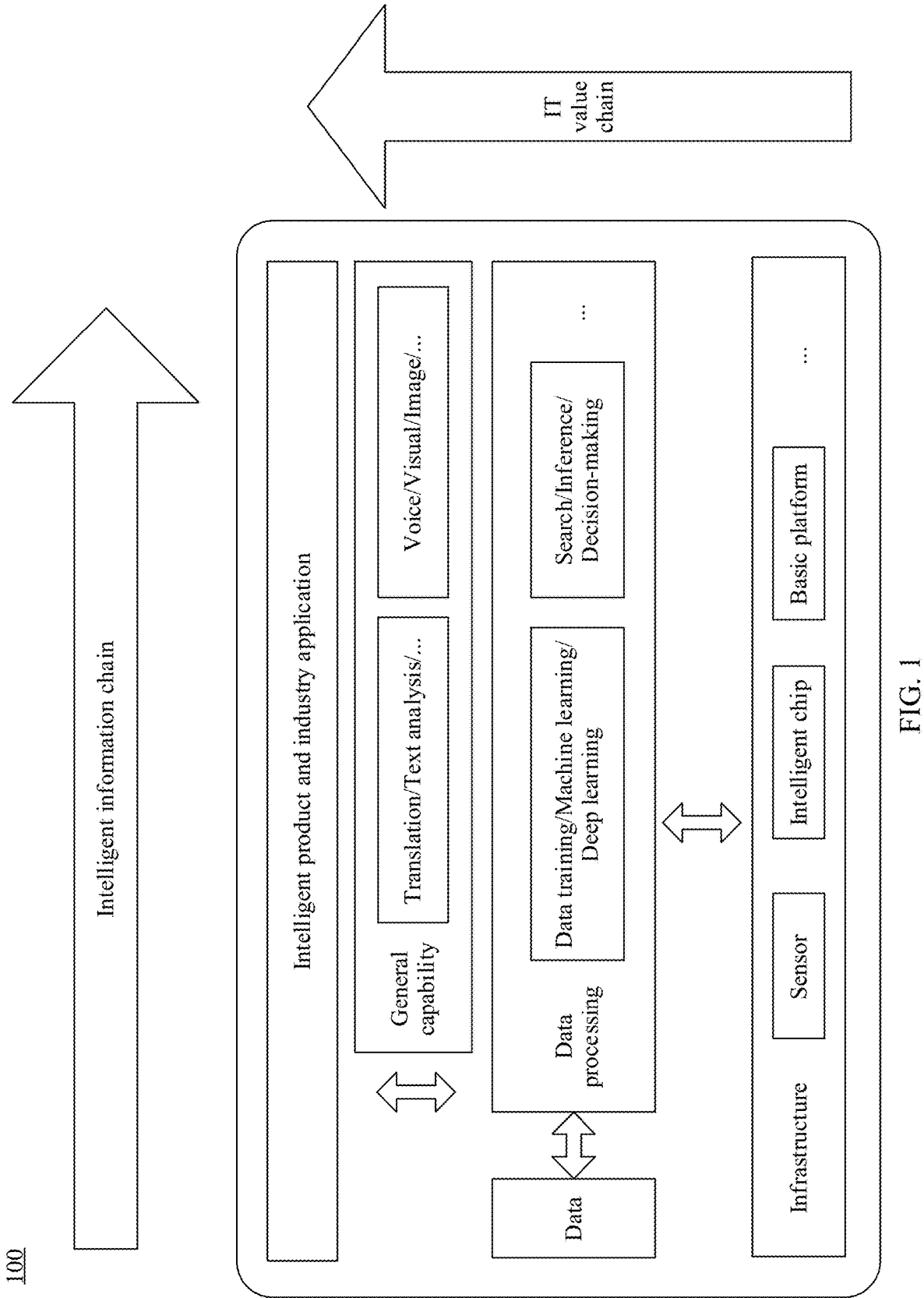
FIG. 1 is a schematic diagram of a main artificial intelligence framework according to an embodiment of this application.

The following describes technical solutions of this application with reference to accompanying drawings.

The following describes technical solutions of this application with reference to accompanying drawings.

Embodiments of this application relate to a neural network. To better understand a method in embodiments of this application, the following first describes terms and concepts related to the neural network.

(1) Neural Network (NN)

The neural network may include a neuron. The neuron may be an operation unit that uses $x_s$ and an intercept 1 as an input. For example, an output of the operation unit may be shown in the following formula:

$$h_{W,b}(x) = f(W^T x) = f\left(\sum_{s=1}^{n} W_s x_s + b\right)$$

S=1, 2, . . . , n, n is a natural number greater than 1, representing a quantity of layers of the neural network, $W_s$ is a weight of $x_s$, and may also be referred to as a parameter or a coefficient of the neural network, $x_s$ is an input of the neural network, and b is a bias of the neuron. f is an activation function of the neuron, and the activation function is used to perform non-linear transformation on a feature of the neural network, to convert an input signal in the neuron into an output signal. The output signal of the activation function may be used as an input of a next convolutional layer, and the activation function may be a sigmoid function. The neural network is a network constituted by linking a plurality of single neurons together. To be specific, an output of one neuron may be an input of another neuron. An input of each neuron may be connected to a local receptive field of a previous layer to extract a feature of the local receptive field. The local receptive field may be a region including several neurons.

(2) Deep Neural Network (DNN)

A deep neural network, also referred to as a multi-layer neural network, may be understood as a neural network including a plurality of hidden layers. The DNN is divided based on locations of different layers, so that the neural network in the DNN may be classified into three types: an input layer, a hidden layer, and an output layer. Generally, the first layer is the input layer, the last layer is the output layer, and the middle layer is the hidden layer. The layers are fully connected, that is, each neuron at an $i^{th}$ layer is connected to a neuron at an $(i+1)^{th}$ layer.

Although the DNN seems complex, work at each layer is actually not complex. Briefly, the work is the following non-linear relationship expression: $\vec{y} = \alpha(W \ \vec{x} + \vec{b})$, where $\vec{x}$ is an input vector, $\vec{y}$ is an output vector, $\vec{b}$ is a bias vector, W is a weight, and may also be referred to as a coefficient or a parameter, where the weight may be in a form of a weight matrix, and $\alpha()$ is an activation function. At each layer, only a simple operation is performed on the input vector $\vec{x}$ to obtain the output vector $\vec{y}$. Because there are a large quantity of DNN layers, there are also a large quantity of weights W and bias vectors $\vec{b}$. A meaning of the weight (referred to as a coefficient for ease of description) at each layer in the DNN is described as follows: The coefficient W is used as an example. It is assumed that in a three-layer DNN, a linear coefficient from a $4^{th}$ neuron at a second layer to a $2^{nd}$ neuron at a third layer is defined as $$W_{24}^3.$$

The superscript 3 represents a quantity of layers at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $$W_{jk}^L.$$

The input layer has no weight W. In the deep neural network, more hidden layers make the network more capable of describing a complex case in the real world. Theoretically, a model with more weights has higher complexity and a larger "capacity". It indicates that the model can complete a more complex learning task. Training the deep neural network is a process of learning a weight, and a final objective of the training is to obtain weights (for example, a weight matrix including coefficients W of a plurality of layers) of all layers of the trained deep neural network.

(3) Convolutional Neural Network (CNN)

A convolutional neural network is a deep neural network of a convolutional structure. The convolutional neural network includes a feature extractor that includes a convolutional layer and a subsampling layer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neural units that are in a rectangular arrangement. Neural units in a same feature plane share a weight, and the weight shared herein is a convolution kernel. Weight sharing may be understood as that an image information extraction manner is irrelevant to a location. The convolution kernel may be initialized in a form of a random-size matrix. In a process of training the convolutional neural network, the convolution kernel may obtain an appropriate weight through learning. In addition, benefits directly brought by weight sharing are that connections between layers of the convolutional neural network are reduced, and an overfitting risk is reduced.

(4) Loss Function

In a process of training the deep neural network, because it is expected that an output of the deep neural network is as much as possible close to a predicted value that is actually expected, a predicted value of a current network and a target value that is actually expected may be compared, and then a weight of each layer of the neural network is updated based on a difference between the predicted value and the target value (certainly, there is usually an initialization process before the first update, to be specific, weights are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" is predefined. This is a loss function or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

(5) Back Propagation (BP)

A neural network may use an error back propagation algorithm to correct a value of a weight in an initial neural network model in a training process, so that a reconstruction error loss of the neural network model becomes smaller. Specifically, an input signal is forward transferred until the error loss is generated in an output, and the weight of the initial neural network model is updated through back propagation of information about the error loss, to converge the error loss. The back propagation algorithm is an error-loss-centered back propagation motion intended to obtain a weight, such as a weight matrix, of an optimal neural network model.

In a conventional solution, a depth estimation model is usually obtained through training by using color image data. However, in the conventional solution, use of a common edge part of a color image and a depth image is ignored. Consequently, quality of a depth estimation image obtained by using the depth estimation model is poor.

In addition, although the current unsupervised depth estimation algorithm eliminates a limitation on a training label to some extent, and limits training costs, after an algorithm model is deployed, the quality of the depth estimation image is also poor when a scenario that is not encountered in a training phase is encountered.

For the foregoing problem, this application provides a depth estimation method. In the method, a depth estimation model used for depth estimation includes a common edge extraction module that can extract a common edge of a color image and a depth image. Therefore, the depth estimation model can use prior information of the color image to improve estimation precision of the depth image. In addition, during training of the depth estimation model, a federated learning method is combined with an unsupervised learning method, so that an algorithm model is periodically updated after being deployed, and quality of the depth image output by the model is further improved.

The solutions in embodiments of this application can be applied to various depth estimation use scenarios such as image recognition, image processing, a high definition map, intelligent driving, intelligent transportation, and autonomous driving.

FIG. 1 is a schematic diagram of a main artificial intelligence framework according to an embodiment of this application. The main framework describes an overall working procedure of an artificial intelligence system, and is applicable to a general requirement of the field of artificial intelligence.

The following describes in detail the foregoing artificial intelligence main framework from two dimensions: an "intelligent information chain" (a horizontal axis) and an "information technology (IT) value chain" (a vertical axis).

The "intelligent information chain" reflects a series of processes from data obtaining to processing. For example, the process may be a general process of intelligent information perception, intelligent information representation and formation, intelligent inference, intelligent decision making, and intelligent execution and output. In this process, the data undergoes a refinement process of "data-information-knowledge-intelligence".

The "IT value chain", from the underlying artificial intelligence infrastructure and information (provision and processing of technical realizations) to the system's industry ecosystem, reflects the value that artificial intelligence contributes to the information technology industry.

(1) Infrastructure

The infrastructure provides computing capability support for the artificial intelligence system, implements communication with the external world, and implements support by using a basic platform.

The infrastructure can communicate with the outside by using a sensor, and a calculation capability of the infrastructure can be provided by an intelligent chip.

The intelligent chip herein may be a hardware acceleration chip, for example, a central processing unit (CPU), a neural-network processing unit (NPU), a graphics processing unit (GPU), an application-specific integrated circuit (ASIC), or a field programmable gate array (FPGA).

The basic platform of the infrastructure may include related platforms assurance and support such as a distributed computing framework and a network, and may include cloud storage and computing, an interconnection and inter-working network, and the like.

For example, the infrastructure can communicate with the outside by using the sensor, to obtain data. Then, the data is provided to an intelligent chip in a distributed computing system provided by the basic platform, for computing.

(2) Data

Data at an upper layer of the infrastructure indicates a data source in the artificial intelligence field. The data relates to at least one of a graph, an image, a voice, a text, and the like. The data is different in different application fields, and may have different representation forms. For example, when the data relates to the internet of things field, content of the data is related to a specific internet of things connection terminal, for example, may include sensing data like a force, a displacement, a liquid level, a temperature, or humidity.

In an embodiment of this application, the data is, for example, a color image.

(3) Data Processing

The foregoing data processing usually includes a process-ing manner such as data training, machine learning, deep learning, search, inference, or decision-making.

Machine learning and deep learning may mean perform-ing symbolic and formal intelligent information modeling, extraction, preprocessing, training, and the like on data.

Inference is a process in which human intelligent infer-ence is simulated in a computer or an intelligent system, and machine thinking and problem resolving are performed by using formal information according to an inference control policy. A typical function is searching and matching.

Decision-making is a process of making a decision after intelligent information is inferred, and usually provides functions such as classification, ranking, and prediction.

(4) General Capability

After data processing mentioned above is performed on data, some general capabilities may be further formed based on a data processing result, for example, an algorithm or a general system, such as translation, text analysis, computer vision processing, voice recognition, and image recognition.

(5) Intelligent Product and Industrial Application

The intelligent product and industry application are a product and an application of the artificial intelligence system in various fields, and are package of an overall solution of the artificial intelligence, so that decision-making for intelligent information is productized and an application is implemented. Application fields mainly include intelligent manufacturing, intelligent transportation, intelligent home, intelligent healthcare, intelligent security protection, autono-mous driving, a safe city, an intelligent terminal, or the like.

Figures 2, 3:
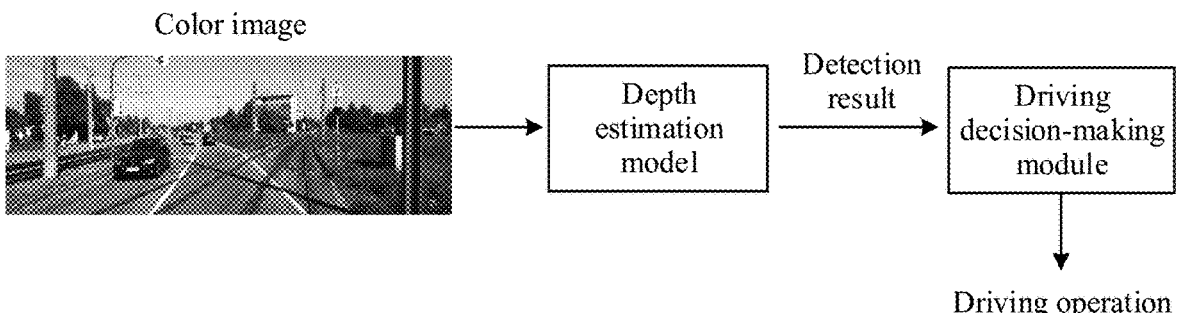
FIG. 2 shows an application scenario of an example of a depth estimation method according to this application.
FIG. 3 shows an application scenario of another example of a depth estimation method according to this application.

FIG. 2 shows a specific application scenario of an example of a depth estimation method according to an embodiment of this application. In this application scenario, a vehicle 220 and a cloud service system 210 may be included, and the vehicle 220 and the cloud service system 210 may communicate with each other through a network.

Some or all functions of the vehicle 220 are controlled by a computing platform 221. The computing platform 221 may include at least one processor 222. The processor 222 may execute instructions 224 stored in a non-transitory com-puter-readable medium such as a memory 223.

In some embodiments, the computing platform 221 may alternatively be a plurality of computing devices that control individual components or subsystems of the vehicle 220 in a distributed manner. The processor 222 may be any con-ventional processor, such as a CPU. Alternatively, the pro-cessor 222 may further include an image processor (graphic process unit, GPU), a field programmable gate array (FPGA), a system on chip (SOC), an ASIC or a combination thereof.

In addition to the instructions 224, the memory 223 may further store data, for example, road map and path informa-tion; a position, a direction, a velocity, and other vehicle data of a vehicle; and other information. Such information may be used by the vehicle 220 and the computing platform 221 during operation of the vehicle 220 in autonomous, semi-autonomous, and/or manual modes.

It should be understood that a structure of the vehicle in FIG. 2 should not be construed as a limitation on embodi-ments of this application.

Optionally, the vehicle 220 may include one or more different types of transportation, or may include one or more different types of transportation tools or movable objects that operate or move on land (for example, a highway, a road, or a railway), water surface (for example, a waterway, a river, or an ocean), or in space. For example, the vehicle may include a car, a bicycle, a motorcycle, a train, a subway, an airplane, a ship, an aircraft, a robot, another type of transportation tool or a movable object, or the like. This is not limited in embodiments of this application.

In addition, the application scenario shown in FIG. 2 may further include a cloud server. In this embodiment of this application, the cloud server may perform perception fusion and computational inference based on the gradient informa-tion uploaded by the vehicle and other information (for example, information about another vehicle and road con-dition information) in the cloud server, to train and update a network gradient, so as to improve accuracy of the depth estimation model.

In an embodiment, the cloud server may alternatively be implemented by using a virtual machine.

Embodiments of this application may be further applied to many fields of artificial intelligence, for example, image recognition, image processing, high definition map, intelli-gent driving, intelligent transportation, and autonomous driving. In particular, embodiments of this application are applied to a branch part that is in these artificial intelligence fields and that requires depth estimation. For example, in the high definition map field, richer information may be obtained through depth estimation, so that map information with higher accuracy can be provided. For another example, in the intelligent driving field, a road condition faced by the vehicle may be further determined through depth estimation, so that a driver can be assisted in performing a correct driving operation based on an actual situation.

The following briefly describes an application scenario of intelligent driving.

In an intelligent driving scenario, road condition infor-mation may be obtained after depth estimation is performed on an input color image, to assist a driver in making a correct decision. As shown in FIG. 3, when a color image collected by a camera is input into a depth estimation model, current road condition information may be obtained, for example, traffic light information, information about another vehicle, pedestrian information, and the like. The road condition information is input into a driving decision-making module. For the road condition information, the driving decision-making module further determines an operation to be per-formed. For example, when the current traffic light infor-mation is a red light, the driving decision-making module sends stop indication information. Further, in some products, the driving decision-making module may further perform an automatic braking operation. For another example, when it is found in the current road condition information that there is a crosswalk in the front, the driving decision-making module sends deceleration indication information. In other words, in FIG. 3, a depth estimation phase is used to improve safety of intelligent driving, and effectively prevent a driver from performing an incorrect operation because the driver neglects observation.

Figure 4:
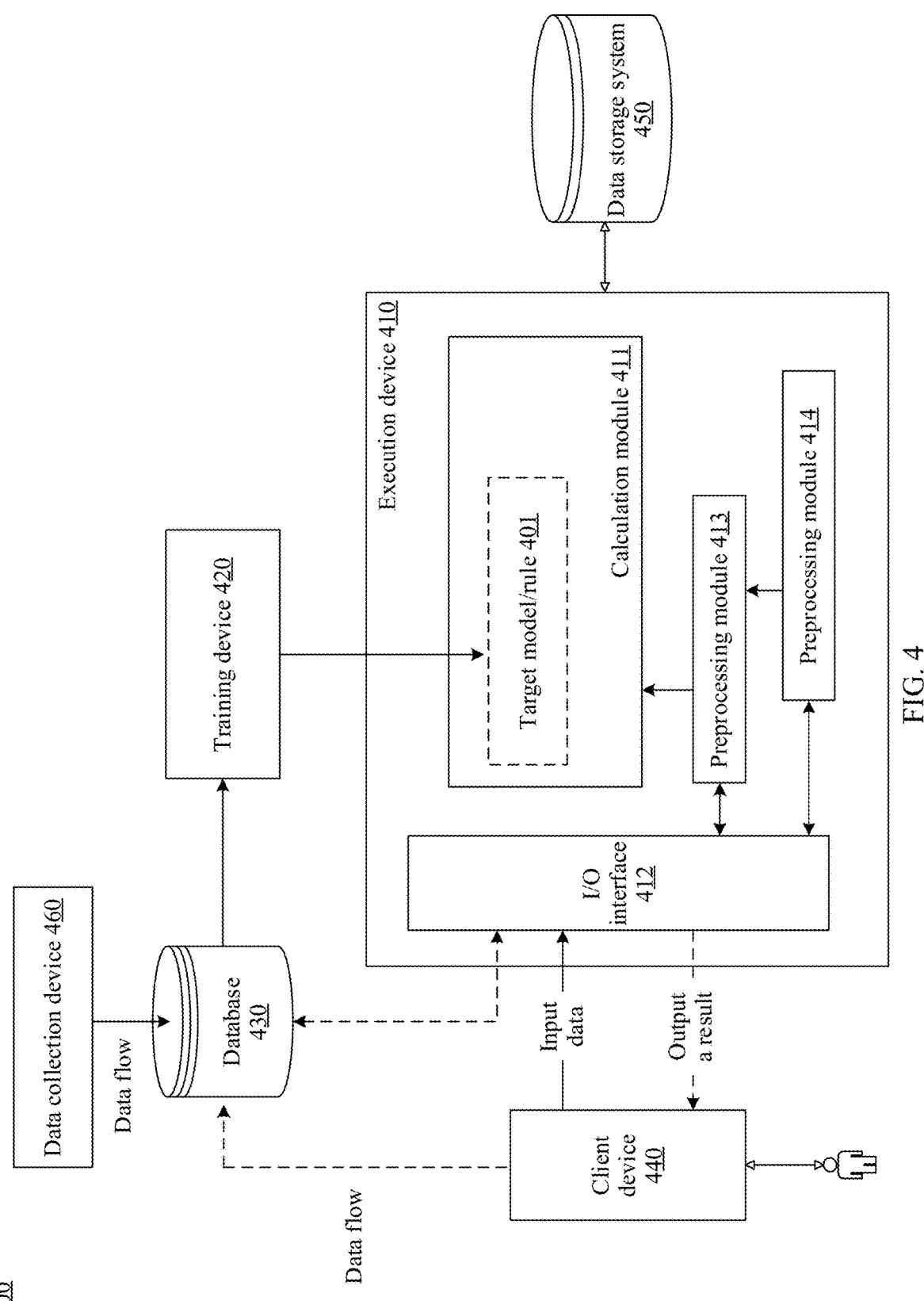
FIG. 4 is a schematic diagram of a system architecture according to an embodiment of this application.

FIG. 4 is a schematic diagram of a system architecture according to an embodiment of this application. The system architecture may be used to train a neural network model, for example, an image recognition model or a depth estimation model. As shown in FIG. 4, a data collection device 460 is configured to collect training data. For the method in embodiments of this application, when a first depth estimation model is trained, the training data may include a color image; and when a second depth estimation model is trained, the training data may include a color image and a first depth estimation image.

After collecting the training data, the data collection device 460 stores the training data in a database 430, and a training device 420 obtains a target model/rule 401 through training based on the training data maintained in the database 430. "A/B" describes an association relationship for describing associated objects and represents that three relationships may exist. For example, A/B may represent the following three cases: Only A exists, both A and B exist, and only B exists.

The following describes how the training device 420 obtains the target model/rule 401 based on the training data. In one case, the training device 420 processes an input original image, and compares an output image with the original image until a difference between the image output by the training device 420 and the original image is less than a specific threshold, to complete training of the target model/rule 401. In this case, the depth estimation model in embodiments of this application may be obtained through training, that is, a trained basic neural network (namely, the second depth estimation model) is obtained, so that the first depth estimation model is obtained subsequently through further training by using the basic neural network. In another case, the training device 420 processes the input color image and a first depth image until accuracy of a category output by the training device 420 is greater than or equal to a specific threshold, to complete training of the target model/rule 401. In this case, the depth estimation model in embodiments of this application may be obtained through training, that is, the depth estimation model is obtained through further training based on the basic neural network.

The target model/rule 401 can be used to implement the method in embodiments of this application. The target model/rule 401 in embodiments of this application may be specifically a neural network. It should be noted that, during actual application, the training data maintained in the database 430 is not necessarily all collected by the data collection device 460, or may be received from another device. In addition, it should be noted that the training device 420 does not necessarily train the target model/rule 401 completely based on the training data maintained in the database 430, or may obtain training data from a cloud or another place to perform model training. The foregoing descriptions should not be construed as a limitation on embodiments of this application.

The target model/rule 401 obtained through training by the training device 420 may be applied to different systems or devices, for example, an execution device 410 shown in FIG. 4. The execution device 410 may be a terminal, for example, a mobile phone terminal, a tablet, a laptop computer, an augmented reality (AR)/virtual reality (VR) terminal, or a vehicle-mounted terminal, or may be a server, a cloud, or the like. In FIG. 4, the execution device 410 configures an input/output (I/O) interface 412, configured to exchange data with an external device. A user may input data to the I/O interface 412 by using a client device 440, where the input data in this embodiment of this application may include a color image input by the client device.

A preprocessing module 413 and a preprocessing module 414 are configured to preprocess the input data (for example, the color image) received by the I/O interface 412. In this embodiment of this application, the preprocessing module 413 and the preprocessing module 414 may not exist (or there may be only one preprocessing module), and a calculation module 411 is directly used to process the input data.

In a process in which the execution device 410 preprocesses the input data, or in a process in which the calculation module 411 of the execution device 410 performs related processing such as calculation, the execution device 410 may invoke data, code, and the like in a data storage system 450 for corresponding processing, and may further store, in the data storage system 450, data, instructions, and the like that are obtained through corresponding processing.

Finally, the I/O interface 412 returns a processing result to the client device 440, to provide the processing result for the user.

It should be noted that the training device 420 may generate corresponding target models/rules 401 for different targets or different tasks based on different training data. The corresponding target models/rules 401 may be used to implement the foregoing targets or complete the foregoing tasks, to provide a required result for the user.

Figure 5:
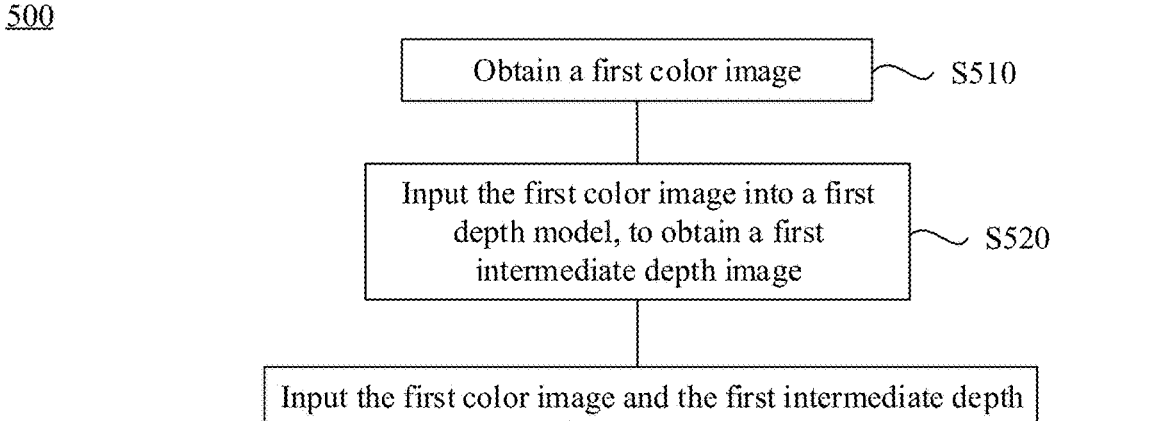
FIG. 5 is a schematic flowchart of an example of a depth estimation method according to this application.

FIG. 5 is a schematic flowchart of an example of a depth estimation method according to this application.

S510: Obtain a first color image.

Optionally, the first color image is a left view or a right view.

Optionally, the first color image may be shot by one or more cameras disposed on a second device. The second device may be a vehicle, an airplane, a mobile phone, or another possible mobile device. This is not limited in this application.

Optionally, the camera may be a binocular camera.

S520: Input the first color image into a first depth estimation model, to obtain a first intermediate depth image.

The first depth estimation model is obtained through training based on a color image and an intermediate depth image corresponding to the color image.

In embodiments of this application, a relationship between the color image and the first color image is not limited. For example, the first color image may be one of the color images. For another example, the first color image does not belong to any one of the foregoing color images, that is, the first color image is not data in a model training data set. As described in the background of this application, a scenario that does not occur in model training may be encountered in a model use process.

Specifically, the inputting the first color image into a first depth estimation model, to obtain a first intermediate depth image may include: obtaining a depth feature vector of the first color image based on the first color image, where the depth feature vector includes a first depth feature vector and a second depth feature vector; obtaining a first target feature vector based on the first depth feature vector and a first weight value, and obtaining a second target feature vector based on the second depth feature vector and a second weight value; and obtaining the first intermediate depth image based on the first target feature vector and the second target feature vector.

In this way, according to the technical solution of this application, a target vector is obtained based on the depth feature vector and a weight value corresponding to the depth feature vector, so as to obtain the intermediate depth image. This helps improve precision of the depth image.

S530: Input the first color image and the first intermediate depth image into a second depth estimation model, to obtain a first target depth image.

The second depth estimation model is obtained through training based on the color image and a target depth image corresponding to the color image.

Specifically, the inputting the first color image and the first intermediate depth image into a second depth estimation model, to obtain a first target depth image may include: obtaining a common edge image based on the first color image and the first intermediate depth image, where the common edge image represents a common edge part of the first color image and the first intermediate depth image; and obtaining the first target depth image based on the common edge image and the first intermediate depth image.

Specifically, the obtaining a common edge image based on the first color image and the first intermediate depth image may include: splicing the first color image and the first intermediate depth image, to obtain an input matrix; performing dimension reduction on the input matrix, to obtain a first matrix and a second matrix; and obtaining the common edge image based on the first matrix and the second matrix.

In this way, according to the technical solution of this application, the common edge image is obtained based on the color image and the intermediate depth image corresponding to the color image, and the target depth image is obtained based on the common edge image and the intermediate depth image corresponding to the color image. This can fully use prior information, namely, the color image, to obtain the common edge image, and effectively use a favorable common edge part in the color image and the intermediate depth image corresponding to the color image, to help improve precision of the target depth estimation image.

Optionally, the method further includes: calculating gradient information of the first depth estimation model and the second depth estimation model based on the first color image and the first target depth image; and sending the gradient information to a first device, where the gradient information is used by the first device to obtain an updated first depth estimation model and an updated second depth estimation model through training.

Optionally, the method may further include: receiving updated first depth estimation model and the updated second depth estimation model from the first device.

In this way, according to the technical solution of this application, gradient information is calculated based on the color image and the target depth image corresponding to the color image, and the gradient information is sent to the first device, and used by the first device to train and update a depth estimation model. This can resolve a problem of difficult upgrade after model deployment, and help improve model precision.

Optionally, the method further includes: obtaining the updated first depth estimation model and the updated second depth estimation model through training based on the gradient information.

In this way, according to the technical solution of this application, the gradient information is calculated based on the color image and the target depth image corresponding to the color image, and the depth estimation model is trained and updated based on the gradient information. This can resolve a problem of difficult upgrade after model deployment, and help improve model precision.

According to the technical solution of this application, the intermediate depth image corresponding to the color image is obtained based on the color image, and the target depth image corresponding to the color image is obtained based on the color image and the intermediate depth image corresponding to the color image. This can fully use prior information, namely, the color image, and help improve precision of a target depth estimation image.

Figure 6:
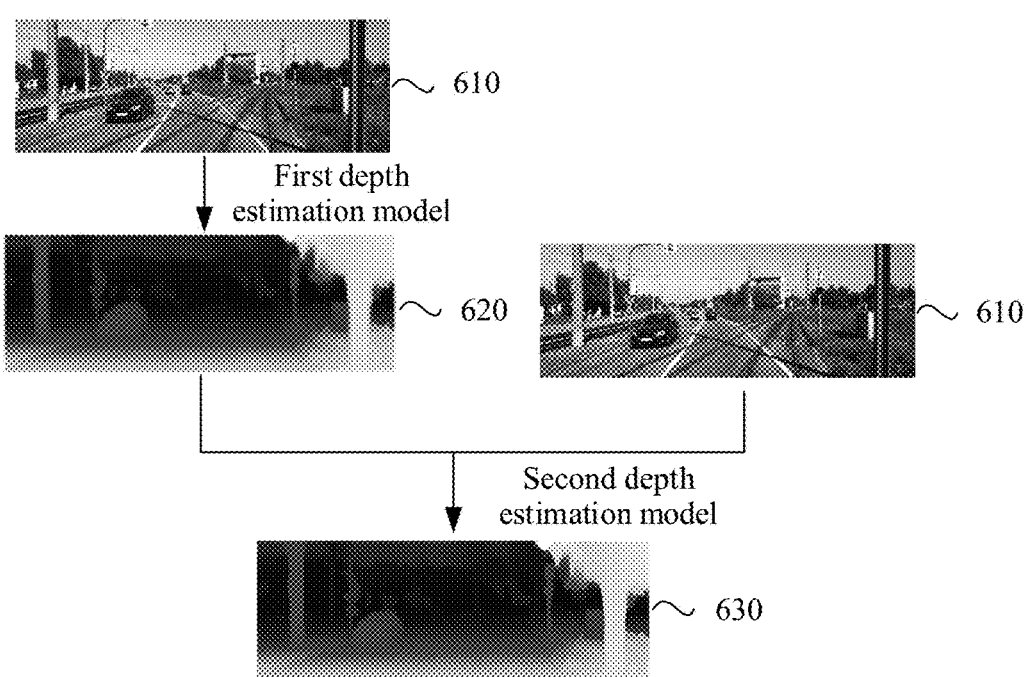
FIG. 6 is an input and output diagram of an example of a depth estimation method according to this application.

FIG. 6 is an input and output diagram of an example of a depth estimation method according to this application.

As shown in FIG. 6, in this embodiment of this application, a first color image 610 is used as an input and is input into a first depth estimation model, to obtain a first intermediate depth image 620, and the first intermediate depth image 620 and the first color image 610 are used as inputs and are input into a second depth estimation model, to obtain a first target depth image 630.

The first color image 610 is the first color image obtained in S510 in FIG. 5. By way of example, and not limitation, the first color image 610 is a right view obtained through shooting by a binocular camera disposed on a vehicle.

The first color image 610 is input into the first depth estimation model, that is, S520 in FIG. 5 is performed, to obtain the first intermediate depth image 620. The first depth estimation model is trained based on a color image and an intermediate depth image corresponding to the color image.

Figure 7:
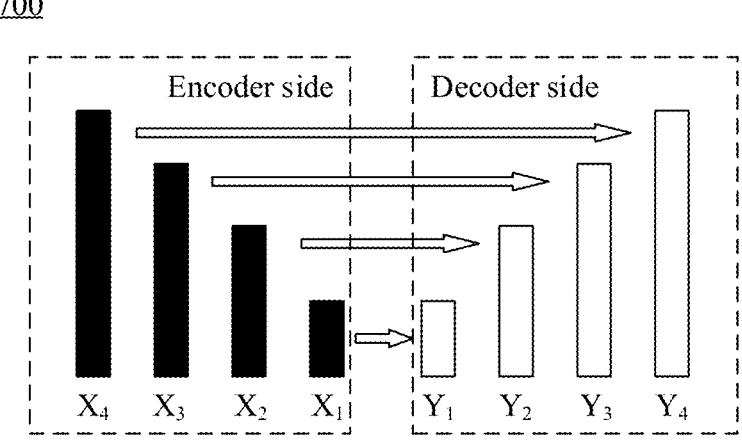
FIG. 7 is a schematic diagram of a structure of an example of a first depth estimation model according to this application.

In a possible implementation, a structure of the first depth estimation model may be shown in FIG. 7, and the first depth estimation model may include an encoder side and a decoder side. By way of example, and not limitation, the first depth estimation model may perform three downsampling operations on the first color image 610 on the encoder side, and perform three upsampling operations on the decoder side, to obtain the first intermediate depth image 620. On the encoder side, the three downsampling operations may include a convolutional network of four phases, for example, black columnar bars $X_i$ (i=1, 2, 3) and $X_4$. The convolution network $X_i$ (i=1, 2, 3) includes n (n=4, 5, 8) improved multi-scale blocks (multi-scale block, MSB) and one 3*3 convolution layer whose step value is 2, where a value of i is in a one-to-one correspondence with a value of n. For example, the convolution network $X_1$ (i=1) includes four (n=4) improved MSBs and one 3*3 convolution layer whose step value is 2, and $X_4$ includes eight MSBs.

Correspondingly, on the decoder side, three upsampling operations are performed, and the first depth estimation model may include three deconvolutional networks and one convolution network, for example, white columnar bars $Y_i$ (i=1, 2, 3) and $Y_4$. The deconvolution network $Y_i$ (i=1, 2, 3) includes one deconvolution layer whose convolution kernel size is 3, and the convolution network $Y_4$ includes a 3*3 convolution layer.

In an embodiment of this application, the first depth estimation model may extract a depth feature vector $X_{n-1}$ from the first color image 610, and perform MSB processing on the depth feature vector $X_{n-1}$, to obtain a target feature vector $X_n$.

Figure 8:
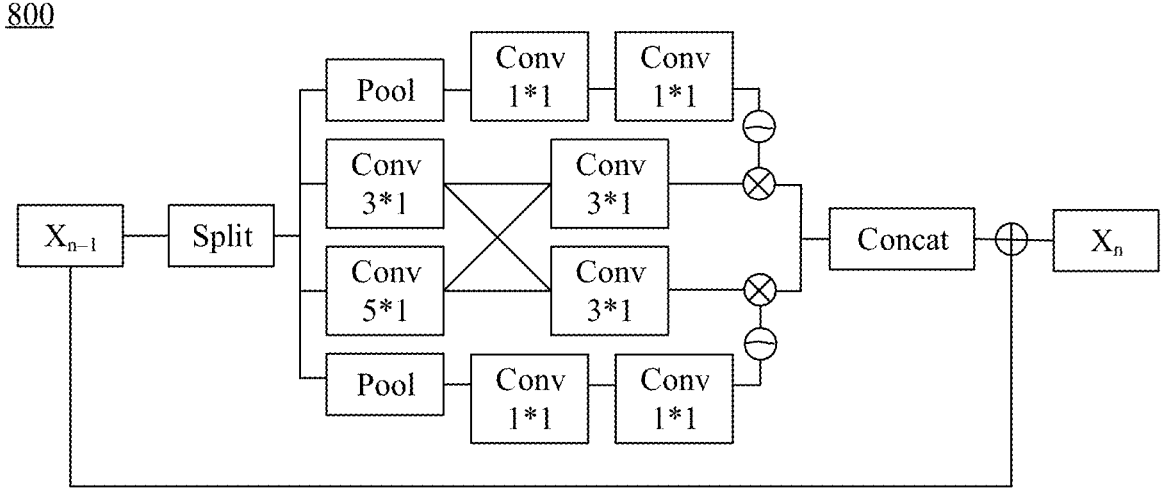
FIG. 8 is a schematic diagram of a structure of an example of an improved multi-scale block MSB according to this application.

The following uses $X_{n-1} \in h*w*c$ as an example to describe in detail an MSB processing process with reference to FIG. 8.

A split operation may be first performed on the depth feature vector $X_{n-1} \in h*w*c$ input into the first depth estimation model according to the following formula (1):

$$\text{feature}_{3*3}, \text{feature}_{5*5} = \text{Split}(X_{n-1});\tag{1}$$

the depth feature vector $X_{n-1}$ is split into two parts along a channel, to obtain $X_{split-1} \in h*w*\frac{1}{2}c$ and $X_{split-2} \in h*w*\frac{1}{2}c$. $X_{split-1} \in h*w*\frac{1}{2}c$ and $X_{split-2} \in h*w*\frac{1}{2}c$ are respectively input into respective multi-scale feature paths according to the following formulas (2) and (3):

$$\text{feature}_{3*3} = relu(bn(\omega_{1*3}(relu(bn(\omega_{3*1}(X_{split\_1}))))))\tag{2}$$

$$\text{feature}_{5*5} = relu(bn(\omega_{1*5}(relu(bn(\omega_{5*1}(X_{split\_2})))))),\tag{3}$$

to obtain a first depth feature vector $\text{feature}_{3+3} \in h*w*\frac{1}{2}c$ and a second depth feature vector $\text{feature}_{5+5} \in h*w*\frac{1}{2}c$. In the formula (2), $w_{1*3}$ and $w_{3*1}$ represent convolution, bn represents a normalized layer, and relu represents an activation layer (rectified linear unit). In addition, $X_{split-1} \in h*w*\frac{1}{2}c$ and $X_{split-2} \in h*w*\frac{1}{2}c$ are respectively input into respective weight paths according to the following formulas (4) and (5):

$$\text{pool}_{3*3} = \text{Sigmoid}(\omega_{1*1}(relu(\omega_{1*1}(avgpool(X_{split\_1})))))\tag{4}$$

$$\text{pool}_{5*5} = \text{Sigmoid}(\omega_{1*1}(relu(\omega_{1*1}(avgpool(X_{split\_2}))))),\tag{5}$$

to obtain a first weight value and a second weight value, where the weight value may be used to distinguish importance of features of different channels. Then, the first depth feature vector $\text{feature}_{3+3} \in h*w*\frac{1}{2}c$, the second depth feature vector $\text{feature}_{5+5} \in h*w*\frac{1}{2}c$, and corresponding weight values are calculated according to the following formulas (6) and (7):

$$\text{feature\_attention}_{3*3} = \text{feature}_{3*3} * \text{pool}_{3*3}\tag{6}$$

$$\text{feature\_attention}_{5*5} = \text{feature}_{5*5} * \text{pool}_{5*5},\tag{7}$$

to obtain a first target depth feature vector $\text{feature\_attention}_{3*3} \in h*w*\frac{1}{2}c$ and a second target depth feature vector $\text{feature\_attention}_{5*5} \in h*w*\frac{1}{2}c$. Then, according to the following formula (8):

$$msb = concat(\text{feature\_attention}_{3*3}, \text{feature\_attention}_{5*5}),\tag{8}$$

$\text{feature\_attention}_{3+3}$ and $\text{feature\_attention}_{5+5}$ are spliced along a channel dimension, to obtain $msb \in h*w*c$. Finally, an element plus operation is performed once on the input depth feature vector $X_{n-1} \in h*w*c$ and $msb \in h*w*c$ according to a formula (9):

$$X_n = msb + X_{n-1},\tag{9}$$

to obtain an output $X_n \in h*w*c$ of the MSB module.

The following briefly describes corresponding processing processes on the encoder side and the decoder side of the first depth estimation model in this application. For this part, refer to an existing technology.

On the encoder side, the first color image 610 is first input into a convolution layer whose convolution kernel size is 3*3, an initial feature $\text{feature}_{init} \in H*W*16$ is extracted, and encoding of layers X1 to X4 are performed on the initial feature, as shown in the following formula (10) to formula (17):

$$\text{feature}_{init} = relu(bn(\omega_{3*3}(I)))\tag{10}$$

$$X_1 = msb(\text{feature}_{init})\tag{11}$$

$$\text{Down}_1 = relu(bn(\omega_{3*3,stride=2}(X_1)))\tag{12}$$

$$X_2 = msb(\text{Down}_1)\tag{13}$$

$$\text{Down}_2 = relu(bn(\omega_{3*3,stride=2}(X_2)))\tag{14}$$

$$X_3 = msb(\text{Down}_2)\tag{15}$$

$$\text{Down}_3 = relu(bn(\omega_{3*3,stride=2}(X_3)))\tag{16}$$

$$X_4 = msb(\text{Down}_3)\tag{17}$$

For ease of description, the first color image is uniformly expressed as I in the formula, and quantities of MSBs in the formulas (11), (13), (15), and (17) are respectively 4, 5, 8, and 8.

On the decoder side, features corresponding to the encoder side are spliced to a corresponding phase, and upsampling is performed by using a deconvolution operation, as shown in formula (18) to formula (22):

$$\text{Up}_1 = relu(bn(Cvt\omega_{3*3,stride=2}(X_4)))\tag{18}$$

$$\text{Up}_2 = relu(bn(Cvt\omega_{3*3,stride=2}(concat(\text{Up}_1, X_3))))\tag{19}$$

$$\text{Up}_3 = relu(bn(Cvt\omega_{3*3,stride=2}(concat(\text{Up}_2, X_2))))\tag{20}$$

$$\text{Up}_4 = relu(bn(Cvt\omega_{3*3,stride=2}(concat(\text{Up}_3, X_1))))\tag{21}$$

$$\text{depth}_{corase} = \omega_{3*3}(\text{Up}_4)\tag{22}$$

Finally, a depth estimation image $\text{depth}_{corase} \in H*W*1$, that is, the first intermediate depth image, in the encoding and decoding phase is output by using a 3*3 convolution layer of channel 1.

After the foregoing processing, S520 shown in FIG. 5 is completed. The first color image is input into the first depth estimation model, to obtain the first intermediate depth image 620.

According to the technical solution of this application, a target vector is obtained based on the depth feature vector and a weight value corresponding to the depth feature vector, so as to obtain the intermediate depth image. This helps improve precision of the depth image.

However, in the foregoing process, as described in the background of this application, prior information, namely, the color image is not well used, resulting in poor quality of the depth estimation image. Based on this, this application further provides a second depth estimation model, to further improve precision of the depth estimation image.

As shown in FIG. 6, in this application, after the first intermediate depth image 620 is obtained, step S530 may be performed, that is, the first color image 610 and the first intermediate depth image 620 are processed by using the second depth estimation model, to obtain the first target depth image 630.

A specific process of obtaining the first target depth image 630 based on the first color image 610 and the first intermediate depth image 620 may be shown in FIG. 9 (the first color image is numbered 610 in FIG. 6, and is numbered 910 in FIG. 9; the first intermediate depth image is numbered 620 in FIG. 6, and is numbered 920 in FIG. 9; and the first target depth image is numbered 630 in FIG. 6, and is numbered 930 in FIG. 9).

First, the input first color image 610 ($I \in H^*W^*3$) and the input first intermediate depth image ($depth_{corase} \in H^*W^*1$) are spliced according to a formula (23):

$$input = relu(bn(\omega_{3*3}(concat(\text{image}, depth_{corase})))); \quad (23)$$

and an input matrix $input \in H^*W^*16$ is obtained through one layer of convolution.

Then, the input matrix $input \in H^*W^*16$ is separately input into a channel attention module (channel attention) and a spatial attention module (spatial attention) for processing, and according to formula (24) and formula (25):

$$attention\_c = concat(\text{max pool}(input), avgpool(input)) \quad (24)$$

$$attention\_s = \omega_{1*1}(concat(relu(bn(\omega_{3*3}(relu(bn(\omega_{1*1}(input)))))), \quad (25)$$

$$relu(bn(\omega_{5*5}(relu(bn(\omega_{1*1}(input))))))),$$

a first matrix $attention\_c \in 1^*1^*32$ and a second matrix $attention\_s \in H^*W^*1$ are obtained. Then, according to formula (26):

$$attention\_map = sigmoid(attention\_s * attention\_c), \quad (26)$$

a common edge image $attention\_map \in H^*W^*1$ is obtained based on the first matrix $attention\_c \in 1^*1^*32$ and the second matrix $attention\_s \in H^*W^*1$, where sigmoid is an activation function.

Finally, according to formula (27):

$$depth_{refine} = depth_{corase} * attention\_map, \quad (27)$$

a final refined depth image $depth_{refine} \in H^*W^*1$, that is, the first target depth image, is obtained based on the first intermediate depth image ($depth_{corase} \in H^*W^*1$) and the common edge image $attention\_map \in H^*W^*1$.

In this way, according to the technical solution of this application, the common edge image is obtained based on the color image and the intermediate depth image corresponding to the color image, and the target depth image is obtained based on the common edge image and the intermediate depth image corresponding to the color image. This can fully use prior information, namely, the color image, to obtain the common edge image, and effectively use a favorable common edge part in the color image and the intermediate depth image corresponding to the color image, to help improve precision of the target depth estimation image.

FIG. 10 is a schematic flowchart of an example of a method for training a depth estimation model according to this application.

S1010: Process a color image by using a first depth estimation model, to obtain an intermediate depth image of the color image, and process the color image and the intermediate depth image of the color image by using a second depth estimation model, to obtain a target depth image of the color image.

Optionally, the color image includes a left view or a right view.

Optionally, the color image is shot by one or more cameras disposed on a terminal device.

Optionally, the camera is a binocular camera.

S1020: Train the first depth estimation model based on the color image and the intermediate depth image of the color image, to obtain an updated first depth estimation model; and train the second depth estimation model based on the color image and the target depth image of the color image, to obtain an updated second depth estimation model.

The updated first depth estimation model is specifically configured to: obtain a depth feature vector of the first color image based on the first color image, where the depth feature vector includes a first depth feature vector and a second depth feature vector; obtain a first target feature vector based on the first depth feature vector and a first weight value, and obtain a second target feature vector based on the second depth feature vector and a second weight value; and obtain the first intermediate depth image based on the first target feature vector and the second target feature vector.

According to the technical solution of this application, the first depth estimation model is obtained through training by using a color image, and the second depth estimation model is obtained through training by using the color image and an intermediate depth image corresponding to the color image. The depth estimation model obtained through training can fully use prior information, namely, the color image, to help improve precision of a target depth estimation image.

The updated second depth estimation model is specifically configured to: obtain a common edge image based on the first color image and the first intermediate depth image, where the common edge image represents a common edge part of the first color image and the first intermediate depth image; and obtain the first target depth image based on the common edge image and the first intermediate depth image.

Optionally, the obtaining a common edge image based on the first color image and the first intermediate depth image includes: splicing the first color image and the first intermediate depth image, to obtain an input matrix; performing dimension reduction on the input matrix, to obtain a first matrix and a second matrix; and obtaining the common edge image based on the first matrix and the second matrix.

Optionally, when a first device trains the first depth estimation model and the second depth estimation model, refer to the training method shown in FIG. 4. Details are not described herein again.

In this way, by using the depth estimation model obtained through training according to the technical solution of this application, the common edge image may be obtained based on the color image and the intermediate depth image corresponding to the color image, and the target depth image may be obtained based on the common edge image and the intermediate depth image corresponding to the color image.

This can fully use prior information, namely, the color image, to obtain the common edge image, and effectively use a favorable common edge part in the color image and the intermediate depth image corresponding to the color image, to help improve precision of the target depth estimation image.

Figure 11:
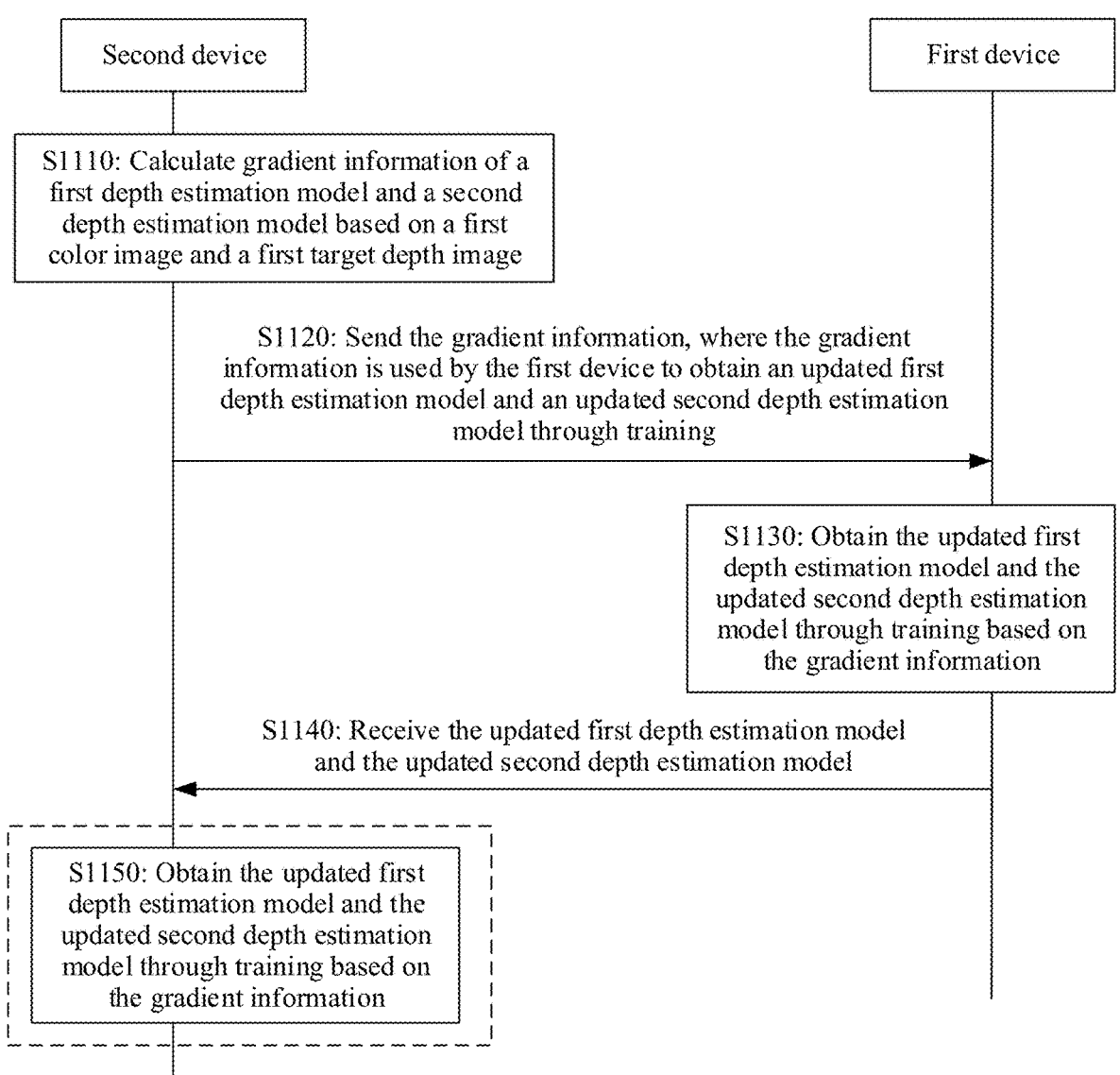
FIG. 11 is a schematic interaction diagram of an example of a method for training a depth estimation model according to this application.

In an embodiment of this application, the method for training a depth estimation model further includes interaction between the first device and the terminal device. As shown in FIG. 11, the first device sends a trained depth estimation model to a second device (for example, the terminal device). In a process of using the model, the second device may reversely calculate gradient information, and feed back the gradient information to the first device, so that the first device obtains an updated depth estimation model through training.

S1110: The second device calculates gradient information of the first depth estimation model and the second depth estimation model based on the first color image and the first target depth image.

Specifically, in a process of using the model, the second device may encounter a large quantity of scenarios that do not exist in a training dataset. For example, the second device is a vehicle equipped with a computing power platform. In a traveling process of the vehicle, a binocular camera disposed in the vehicle may shoot a first color image that does not exist in the training dataset, and inference may be performed on the first color image by using the first depth estimation model and the second depth estimation model that are deployed on the computing power platform, to obtain the first target depth image. Further, the computing power platform may reversely calculate a network gradient, to obtain the gradient information.

S1120: The second device sends the gradient information of the first depth estimation model and the second depth estimation model to the first device, where the gradient information is used by the first device to train to obtain an updated first depth estimation model and an updated second depth estimation model through training.

S1130: The first device obtains the updated first depth estimation model and the updated second depth estimation model through training based on the gradient information.

S1140: The second device receives the updated first depth estimation model and the updated second depth estimation model from the first device.

According to the technical solution of this application, the first device may obtain an updated depth estimation model through training based on gradient information calculated by the second device based on the color image and the target depth image corresponding to the color image. This can resolve a problem of difficult upgrade after model deployment, and help improve model precision.

Optionally, under a specific condition, the second device may perform S1150, to obtain the updated first depth estimation model and the updated second depth estimation model through training based on the gradient information.

In this way, the second device may train and update the depth estimation model based on the gradient information calculated based on the color image and the target depth image corresponding to the color image. This can resolve a problem of difficult upgrade after model deployment, and help improve model precision.

The foregoing describes in detail the depth estimation method and the method for training a depth estimation model provided in embodiments of this application with reference to FIG. 5 to FIG. 11. It may be understood that, to implement the foregoing functions, each device includes a corresponding hardware structure and/or a corresponding software module for performing each function. A person skilled in the art should be able to be aware that, in combination with the examples described in embodiments disclosed in this specification, units and algorithm steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

The following describes in detail the depth estimation apparatus and the apparatus for training a depth estimation model provided in embodiments of this application with reference to FIG. 12 to FIG. 15. It should be understood that descriptions of apparatus embodiments correspond to the descriptions of the method embodiments. Therefore, for content that is not described in detail, refer to the foregoing method embodiments. For brevity, some content is not described again.

Figure 12:
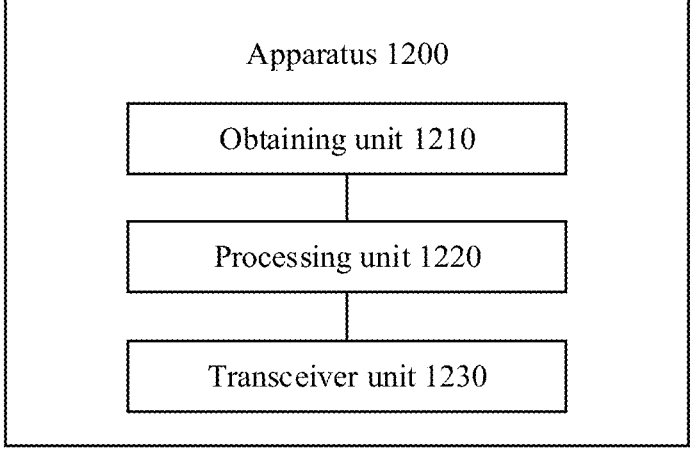
FIG. 12 is a schematic block diagram of an example of a depth estimation apparatus according to this application.

FIG. 12 is a schematic diagram of a structure of an example of a depth estimation apparatus according to this application. The depth estimation apparatus 1200 shown in FIG. 12 includes an obtaining unit 1210, a processing unit 1220, and a transceiver unit 1230.

The obtaining unit 1210, the processing unit 1220, and the transceiver unit 1230 may be configured to perform the depth estimation method in embodiments of this application. The processing unit 1220 can implement functions of the first depth estimation model and the second depth estimation model in FIG. 5 to FIG. 9.

For example, the obtaining unit 1210 is configured to obtain a first color image. The processing unit 1220 is configured to: input the first color image into a first depth estimation model, to obtain a first intermediate depth image; and input the first color image and the first intermediate depth image into a second depth estimation model, to obtain a first target depth image. The transceiver unit 1230 is configured to send gradient information to a first device, where the gradient information is used by the first device to obtain an updated first depth estimation model and an updated second depth estimation model through training.

It should be understood that the processing unit 1220 in the apparatus 1200 may be equivalent to a processor 1320 in an apparatus 1300 in the following descriptions.

Figure 13:
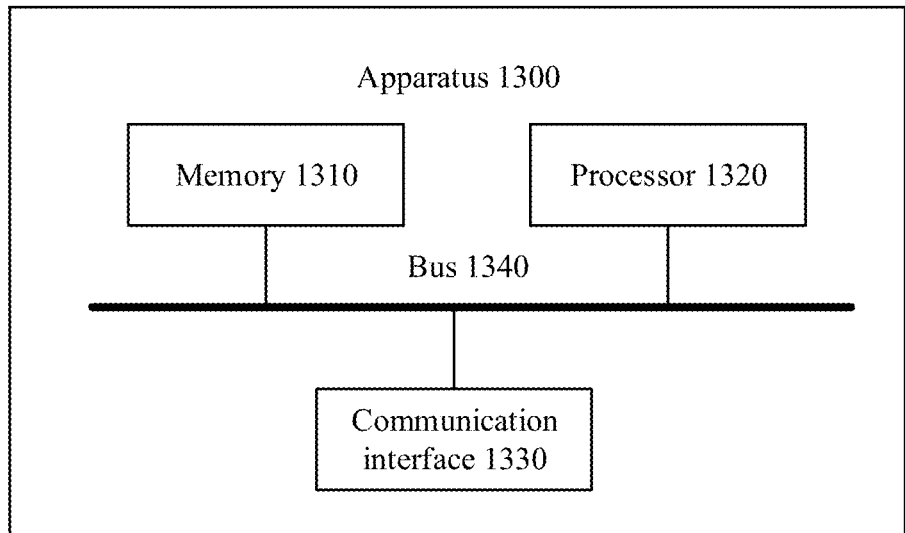
FIG. 13 is a schematic diagram of a structure of an example of a hardware structure of a depth estimation apparatus according to this application.

FIG. 13 is a schematic diagram of a hardware structure of a depth estimation apparatus according to an embodiment of this application. The depth estimation apparatus 1300 shown in FIG. 13 (the apparatus 1300 may be specifically a computer device) includes a memory 1310, a processor 1320, a communication interface 1330, and a bus 1340. The memory 1310, the processor 1320, and the communication interface 1330 implement communication connection between each other through the bus 1340.

Optionally, the communication interface may further implement communication with another device, for example, communication with a first device.

The memory 1310 may be a read-only memory (ROM), a static storage device, a dynamic storage device, or a random access memory (RAM). The memory 1310 may store a program. When the program stored in the memory 1310 is executed by the processor 1320, the processor 1320 and the communication interface 1330 are configured to perform steps of the depth estimation method in embodiments of this application.

The processor 1320 may be a general-purpose CPU, a microprocessor, an application-specific integrated circuit (ASIC), a graphics processing unit (GPU), or one or more integrated circuits configured to execute a related program, to implement a function that needs to be executed by a unit in the depth estimation apparatus in embodiments of this application, or perform the depth estimation method in the method embodiments of this application.

Alternatively, the processor 1320 may be an integrated circuit chip and has a signal processing capability. In an implementation process, steps of the depth estimation method in embodiments of this application may be completed by using a hardware integrated logic circuit in the processor 1320 or instructions in a form of software. Alternatively, the processor 1320 may be a general-purpose processor, a digital signal processor (DSP), an ASIC, a FPGA or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1310. The processor 1320 reads information in the memory 1310, and completes, in combination with hardware of the processor, a function that needs to be performed by a unit included in the depth estimation apparatus in embodiments of this application, or performs the depth estimation method in the method embodiments of this application.

The communication interface 1330 uses, for example, but not limited to, a transceiver-like apparatus, to implement communication between the apparatus 1300 and another device or a communication network. For example, the first depth estimation model and/or the second depth estimation model may be obtained through the communication interface 1330.

The bus 1340 may include a path for transmitting information between components (for example, the memory 1310, the processor 1320, and the communication interface 1330) of the apparatus 1300.

Figure 14:
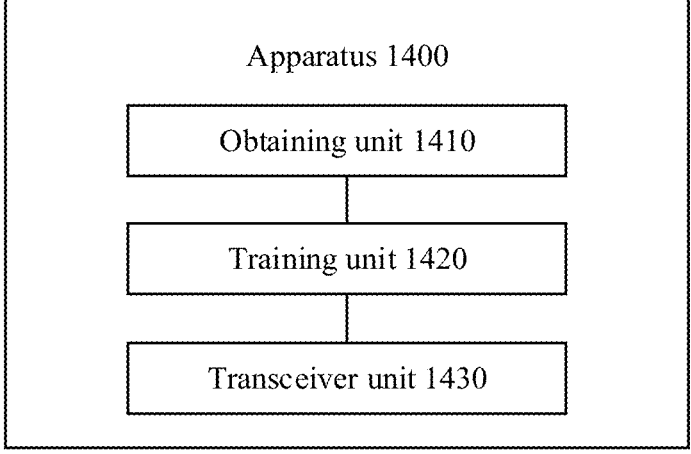
FIG. 14 is a schematic block diagram of an example of an apparatus for training a depth estimation model according to this application.

FIG. 14 is a schematic block diagram of an apparatus for training a depth estimation model according to an embodiment of this application. The apparatus 1400 for training a depth estimation model shown in FIG. 14 includes an obtaining unit 1410, a training unit 1420, and a transceiver unit 1430.

The obtaining unit 1410, the training unit 1420, and the transceiver unit 1430 may be configured to perform the method for training a depth estimation model in embodiments of this application.

For example, the obtaining unit 1410 is configured to: process a color image by using a first depth estimation model, to obtain an intermediate depth image of the color image, and process the color image and the intermediate depth image of the color image by using a second depth estimation model, to obtain a target depth image of the color image. The training unit 1420 is configured to: train the first depth estimation model based on the color image and the intermediate depth image of the color image, to obtain an updated first depth estimation model, and train the second depth estimation model based on the color image and the target depth image of the color image, to obtain an updated second depth estimation model. The transceiver unit 1430 is configured to: receive gradient information of the first depth estimation model and the second depth estimation model, where the gradient information is obtained by a second device through calculation based on the first color image and the first target depth image; and send the updated first depth estimation model and the updated second depth estimation model to the second device.

It should be understood that the training unit 1420 in the apparatus 1400 may be equivalent to a processor 1520 in an apparatus 1500 in the following descriptions.

Figure 15:
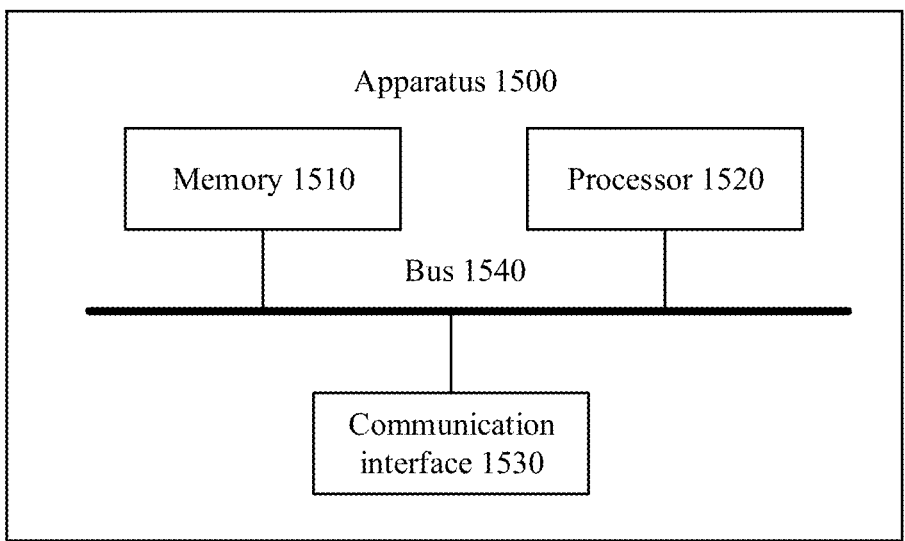
FIG. 15 is a schematic diagram of a structure of an example of a hardware structure of an apparatus for training a depth estimation model according to this application.

FIG. 15 is a schematic diagram of a hardware structure of an apparatus for training a depth estimation model according to an embodiment of this application. The apparatus 1500 for training a depth estimation model shown in FIG. 15 (the apparatus 1500 may be specifically a computer device) includes a memory 1510, a processor 1520, a communication interface 1530, and a bus 1540. The memory 1510, the processor 1520, and the communication interface 1530 implement communication connection between each other through the bus 1540.

Optionally, the communication interface may further implement communication with another device, for example, communication with a second device.

The memory 1510 may be a ROM, a static storage device, a dynamic storage device, or a RAM. The memory 1510 may store a program. When the program stored in the memory 1510 is executed by the processor 1520, the processor 1520 and the communication interface 1530 are configured to perform steps of the method for training a depth estimation model in embodiments of this application.

The processor 1520 may be a CPU, a microprocessor, an ASIC, a GPU, or one or more integrated circuits configured to execute a related program, to implement a function that needs to be performed by a unit in the apparatus for training a depth estimation model in embodiments of this application, or perform the method for training a depth estimation model in the method embodiments of this application.

Alternatively, the processor 1520 may be an integrated circuit chip and has a signal processing capability. In an implementation process, steps of the method for training a depth estimation model in embodiments of this application may be completed by using a hardware integrated logic circuit in the processor 1520 or instructions in a form of software. The processor 1520 may alternatively be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1510. The processor 1520 reads information in the memory 1510, and completes, in combination with hardware of the processor, a function that needs to be performed by a unit included in the apparatus for training a depth estimation model in embodiments of this application, or performs the method for training a depth estimation model in the method embodiments of this application.

The communication interface 1530 uses, for example, but not limited to, a transceiver-like apparatus, to implement communication between the apparatus 1500 and another device or a communication network. For example, first training data may be obtained through the communication interface 1530.

The bus 1540 may include a path for transmitting information between components (for example, the memory 1510, the processor 1520, and the communication interface 1530) of the apparatus 1500.

It should be noted that although only a memory, a processor, and a communication interface are shown in the apparatus 1300 shown in FIG. 13 and the apparatus 1500 shown in FIG. 15, in a specific implementation process, a person skilled in the art should understand that the apparatus 1300 and the apparatus 1500 further include other components required for normal running. In addition, based on a specific requirement, a person skilled in the art should understand that the apparatus 1300 and the apparatus 1500 each may further include a hardware component for implementing another additional function. In addition, a person skilled in the art should understand that the apparatus 1300 and the apparatus 1500 each may include only components necessary for implementing embodiments of this application, but not necessarily include all the components shown in FIG. 13 and FIG. 15.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different apparatuses to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, method, and apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be positioned in one position, or may be distributed on a plurality of network units. Some or all of the units may be selected based on actual requirements to achieve the objectives of the solutions in embodiments.

In addition, function units in embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device) to perform all or some of the steps of the methods described in embodiments of this application. The foregoing storage medium includes any medium that can store program code, such as a universal serial bus flash disk (USB flash disk, UFD), where the UFD may also be referred to as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A depth estimation method performed by a depth estimation device, comprising: obtaining a first color image; inputting the first color image into a first depth estimation model, to obtain a first intermediate depth image, wherein the first depth estimation model is obtained through training based on a training color image and an intermediate depth image corresponding to the training color image; and inputting the first color image and the first intermediate depth image into a second depth estimation model, to obtain a first target depth image, wherein the second depth estimation model is obtained through training based on the training color image and a target depth image corresponding to the training color image, wherein the first depth estimation model and the second depth estimation model are neural network models, wherein the first target depth image is a refined image obtained based on the first intermediate depth image, wherein inputting the first color image and the first intermediate depth image into the second depth estimation model to obtain the first target depth image comprises: obtaining a common edge image based on the first color image and the first intermediate depth image, wherein the common edge image represents a common edge part of the first color image and the first intermediate depth image; and obtaining the first target depth image based on the common edge image and the first intermediate depth image.

2. The method according to claim 1, wherein the step of obtaining the common edge image comprises: splicing the first color image and the first intermediate depth image, to obtain an input matrix; performing dimension reduction on the input matrix, by separately inputting the input matrix into a channel attention module to obtain a first matrix and into a spatial attention module to obtain a second matrix; and obtaining the common edge image based on the first matrix and the second matrix.

3. The method according to claim 1, wherein the step of inputting the first color image into the first depth estimation model to obtain the first intermediate depth image comprises: obtaining a depth feature vector of the first color image based on the first color image; performing a split operation on the depth feature vector to obtain a first part of the depth feature vector and a second part of the depth feature vector; inputting the first part and the second part into respective multi-scale feature paths to obtain a first depth feature vector and a second depth feature vector; obtaining a first target feature vector based on the first depth feature vector and a first weight value, and obtaining a second target feature vector based on the second depth feature vector and a second weight value; and obtaining the first intermediate depth image based on the first target feature vector and the second target feature vector by splicing the first target feature vector and the second target feature vector.

4. The method according to claim 1, wherein the training color image comprises a left view or a right view of a vehicle.

5. The method according to claim 4, wherein the training color image is shot by a camera disposed on the vehicle.

6. The method according to claim 5, wherein the camera is a binocular camera.

7. The method according to claim 1, further comprising:
   calculating gradient information of the first depth estimation model and the second depth estimation model based on the first color image and the first target depth image; and
   sending the gradient information to a first device, wherein the gradient information is used by the first device to obtain an updated first depth estimation model and an updated second depth estimation model through training.

8. The method according to claim 7, further comprising:
   receiving the updated first depth estimation model and the updated second depth estimation model from the first device.

9. The method according to claim 7, further comprising:
   obtaining the updated first depth estimation model and the updated second depth estimation model through training based on the gradient information.

10. A method for training a depth estimation model, comprising: processing a color image by using a first depth estimation model, to obtain an intermediate depth image of the color image; processing the color image and the intermediate depth image of the color image by using a second depth estimation model, to obtain a target depth image of the color image; training the first depth estimation model based on the color image and the intermediate depth image of the color image, to obtain an updated first depth estimation model; and training the second depth estimation model based on the color image and the target depth image of the color image, to obtain an updated second depth estimation model, wherein the first depth estimation model and the second depth estimation model are neural networks, wherein the target depth image is a refined image obtained based on the intermediate depth image, wherein the updated second depth estimation model is configured to: obtain a common edge image based on the first color image and the first intermediate depth image, wherein the common edge image represents a common edge part of the first color image and the first intermediate depth image; and obtain the first target depth image based on the common edge image and the first intermediate depth image.

11. The training method according to claim 10, wherein the step of obtaining the common edge image comprises: splicing the first color image and the first intermediate depth image, to obtain an input matrix; performing dimension reduction on the input matrix, by separately inputting the input matrix into a channel attention module to obtain a first matrix and into a spatial attention module to obtain a second matrix; and obtaining the common edge image based on the first matrix and the second matrix.

12. The training method according claim 10, wherein the updated first depth estimation model is configured to: obtain a depth feature vector of the first color image based on the first color image; perform a split operation on the depth feature vector to obtain a first part of the depth feature vector and a second part of the depth feature vector; input the first part and the second part into respective multi-scale feature paths to obtain a first depth feature vector and a second depth feature vector; obtain a first target feature vector based on the first depth feature vector and a first weight value, and obtain a second target feature vector based on the second depth feature vector and a second weight value; and obtain the first intermediate depth image based on the first target feature vector and the second target feature vector by splicing the first target feature vector and the second target feature vector.

13. The training method according to claim 10, wherein the color image comprises a left view or a right view of a vehicle.

14. The training method according to claim 10, further comprising: receiving gradient information of the first depth estimation model and the second depth estimation model, wherein the gradient information is obtained by a device through calculation based on the first color image and the first target depth image; and obtaining the updated first depth estimation model and the updated second depth estimation model through training based on the gradient information.

15. The training method according to claim 14, further comprising:
   sending the updated first depth estimation model and the updated second depth estimation model.

16. A depth estimation apparatus comprising: a data interface; a memory storing executable instructions; and a processor configured to execute the executable instructions to perform operations of: obtaining, through the data interface, a first color image; inputting the first color image into a first depth estimation model to obtain a first intermediate depth image, wherein the first depth estimation model is obtained through training based on a training color image and an intermediate depth image corresponding to the training color image; and inputting the first color image and the first intermediate depth image into a second depth estimation model to obtain a first target depth image, wherein the second depth estimation model is obtained through training based on the training color image and a target depth image corresponding to the color image, wherein the first depth estimation model and the second depth estimation model are neural network models, wherein the first target depth image is a refined image obtained based on the first intermediate depth image, wherein inputting the first color image and the first intermediate depth image into the second depth estimation model to obtain the first target depth image comprises:

obtaining a common edge image based on the first color image and the first intermediate depth image, wherein the common edge image represents a common edge part of the first color image and the first intermediate depth image; and obtaining the first target depth image based on the common edge image and the first intermediate depth image.

17. The depth estimation apparatus according to claim 16, wherein the operation of obtaining the common edge image comprises: splicing the first color image and the first intermediate depth image, to obtain an input matrix; performing dimension reduction on the input matrix, by separately inputting the input matrix into a channel attention module to obtain a first matrix and into a spatial attention module to obtain a second matrix; and obtaining the common edge image based on the first matrix and the second matrix.

*  *  *  *  *